(No Model.)  2 Sheets—Sheet 1.

W. H. ANDERSON.
MECHANICAL MOVEMENT.

No. 311,220. Patented Jan. 27, 1885.

WITNESSES:
Gunvald Aas.
John H. Fisher.

INVENTOR
William H. Anderson
BY
James H. Whitney
ATTORNEY

N. PETERS. Photo-Lithographer, Washington, D. C.

(No Model.) 2 Sheets—Sheet 2.
W. H. ANDERSON.
MECHANICAL MOVEMENT.
No. 311,220. Patented Jan. 27, 1885.
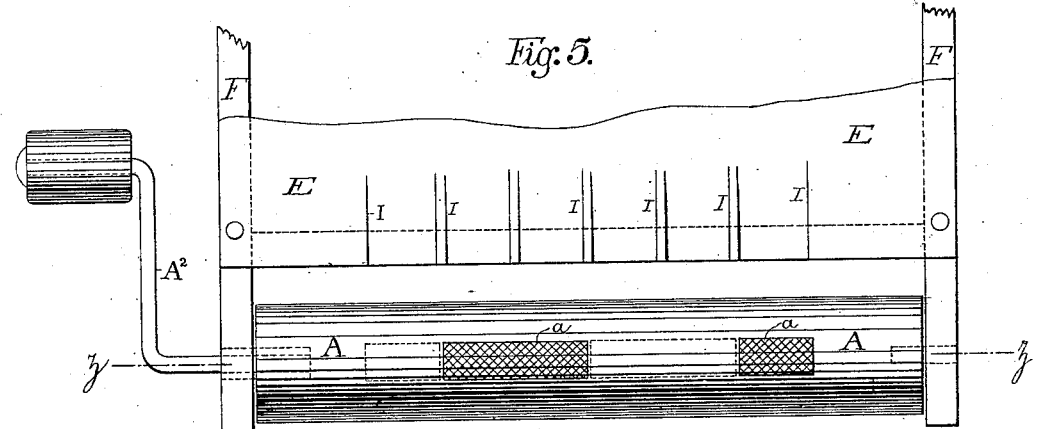
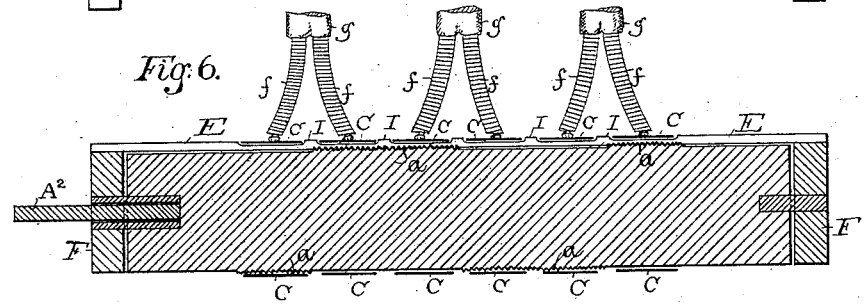
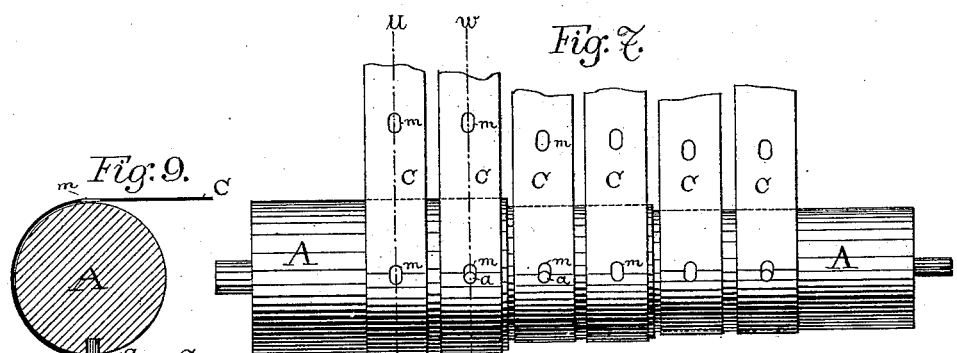
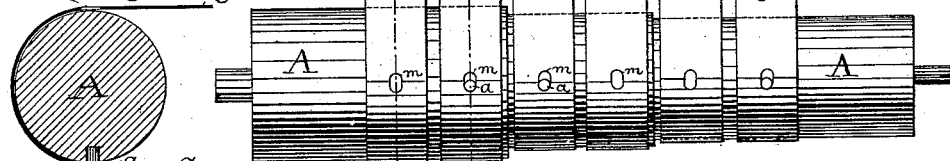
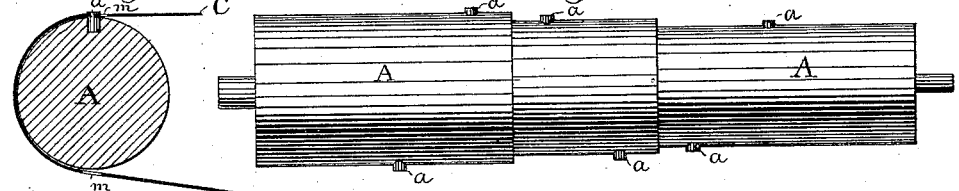
WITNESSES:
Gunvald Aas.
John H Fisher
INVENTOR
William H. Anderson.
BY James A Whitney
ATTORNEY

UNITED STATES PATENT OFFICE.

WILLIAM H. ANDERSON, OF BROOKLYN, NEW YORK.

MECHANICAL MOVEMENT.

SPECIFICATION forming part of Letters Patent No. 311,220, dated January 27, 1885.

Application filed June 2, 1884. (No model.)

*To all whom it may concern:*

Be it known that I, WILLIAM H. ANDERSON, of Brooklyn, in the county of Kings and State of New York, have invented a certain Improvement in Mechanical Movements, of which the following is a specification.

The object of this invention is to provide new and improved means for transmitting motion which will be capable of advantageous employment for various purposes in the mechanical arts under conditions requiring an intermittent and alternating movement of parts.

Figure 1:
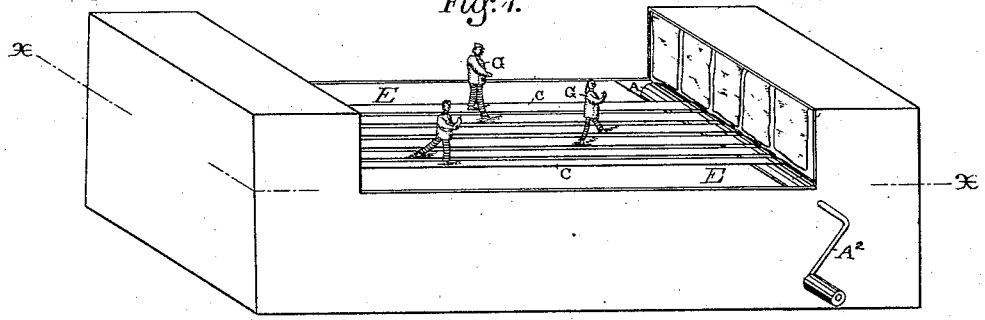
Figure 2:
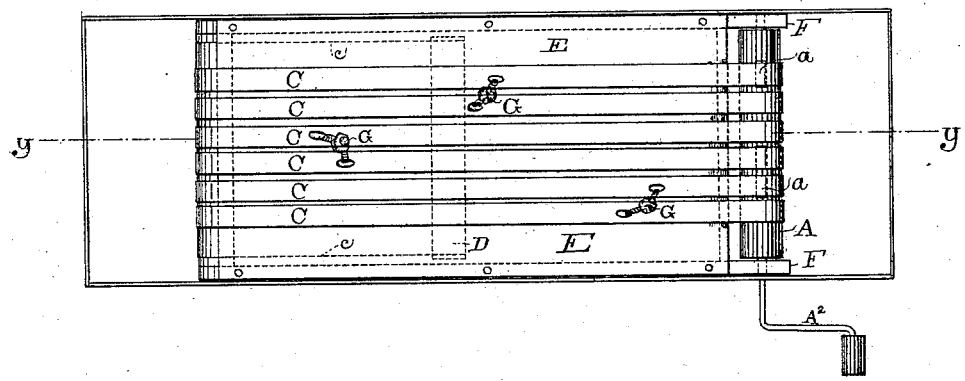
Figure 3:
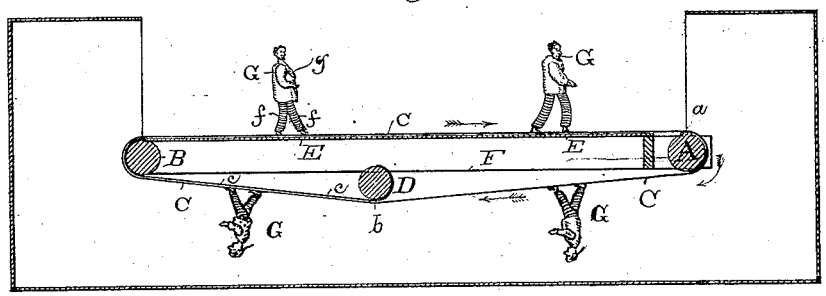
Figure 4:
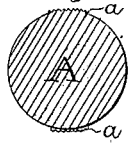

Figure 1 is a perspective view, and Fig. 2 a plan view, of a mechanical movement constructed according to my said invention. Fig. 3 is a vertical longitudinal sectional view taken in the line $y\,y$ of Fig. 2. Fig. 4 is a transverse sectional view, on a larger scale than Figs. 1, 2, and 3, of one of the parts included in the apparatus. Fig. 5 is a detail view, also on a larger scale than Figs. 1, 2, and 3, of one portion of the apparatus, taken in a vertical plane at right angles to that of Fig. 3. Fig. 6 is a longitudinal sectional view of the parts represented in Fig. 5, and taken in the line $z\,z$ of said figure. Figs. 7 and 8 are detail views illustrating a modified construction included in my said invention. Fig. 9 is a sectional view taken in the line $u\,u$ of Fig. 7, and Fig. 10 is a similar view taken in the line $w\,w$ of Fig. 7.

A is a roller supported on suitable journals or gudgeons in any suitable frame-work or support, as hereinafter set forth. This roller is provided upon its circumference with what I term "gripping-surfaces," which may be either projections, teeth, or merely roughened or friction-producing surfaces, so arranged that when said surfaces act upon the belts or aprons hereinafter described the movement of said belts or aprons will be accelerated, and at other times slackened or even stopped altogether.

B is a bar of cylindrical or any other suitable shape, placed in a position substantially parallel with that of the roller A. It is designed that this bar should be fixed. It may, however, in certain contingencies be permitted to revolve on its axis after the manner of a roller.

C are endless belts or aprons placed parallel with each other, and passed over the roller A and bar B, as indicated in Fig. 3. The roller A, adjacent to each of the belts or aprons C passing over the same, is provided with a shoulder or projection, $a$, or, in lieu thereof, with a roughened surface, which, as shown in Fig. 4, may be provided upon the shoulder or projection, but which, when desired, may be flush with the surface of the roller.

As concerns each pair of belts or aprons C, one of the belts or aprons composing the pair is actuated by a roughened or friction-producing surface at one side of the roller, while the other of the belts or aprons composing said pair is actuated by a like friction-producing surface at the opposite side of said roller, so that the two belts or aprons will be actuated alternately.

In lieu of the friction-producing surfaces, shoulders or projections similarly situated on the roller may be employed, or, in lieu of such devices, teeth radially provided to the roller and meshing into holes in the belts or aprons, as indicated in Figs. 7, 8, 9, and 10, may be employed, all as herein further explained.

In practice the belts or endless aprons C are tightened over the roller A to such an extent that the rotation of the latter will cause the shoulders or projections or their equivalents herein indicated, to act upon the said belts or aprons, and by elongating the same increasing the frictional or propelling grip of said roller against the contiguous surfaces of said belts or aprons to rotate or move the same. This propelling action of each of the shoulders or projections continues during the contact of the shoulder or projection or equivalent thereof with the belt or apron. In other words, as each of said shoulders or projections $a$, or the equivalent thereof, as aforesaid, is brought upward in contact with the contiguous belt or apron, by reason of the increased gripping or driving action of the shoulders or projections, as aforesaid, so as to act thereon, an increased rapidity is given to the movement of the belt or apron. When the radius of the roller A extended through such shoulder is greater than the radius at other portions of the same circumference of the roller, the increased speed may be in a measure due to such relatively increased radius of the driving-roller, and inasmuch as the shoulders $a$ alternate upon the opposite sides of the roller A, it follows that this accelerated movement of the two belts or aprons of each pair alternate, first one moving faster and then the other. By this means an alternating movement may be transmitted from the said belts or aprons to any appropriate mechanism. As the straightening or elongation of the belts or aprons increases their tension upon the roller, it follows that their propulsion by the projections or shoulders is secured, although otherwise—that is to say, when not acted upon by said projections or shoulders or their equivalents—the said belts or aprons, even though acted upon by the bar D, hereinafter described, are sufficiently slack to permit the movement of the roller without moving the belts or aprons; but when the driving-surface of the roller—as, for example, the roughened surface—is flush with the circumference of the roller, or when the toothed modification is used, the belts or aprons will slip on the roller, except when acted upon by the driving-surfaces, and the whole of the movement of the belts or aprons is in such case due to the traction of the roller upon the belt or apron.

In order that the belts or aprons C may have the requisite drag or tension upon the roller A, it is desirable that a device in the nature of an idler-pulley be used to take up the slack of the belts or aprons as the shoulders or projections $a$ pass out of contact therewith, thereby causing the said belts or aprons to pass upon the diminished circumference of the said roller. This may be accomplished by means of a bar or weight, D, which may be of a cylindrical form, placed upon the lower portions, $b$, of the said belts or aprons, and retained in position by a suitably-stiff plate, $c$, which latter may be of wood, metal, or other material, extended inward from the bar B, but which is sufficiently flexible to allow the bar D to press downward upon the belts or aprons C.

To further assist the dragging action of the belts or aprons C, to insure the closer contact of the driving or gripping surfaces or devices of the roller A, there may be placed underneath the latter a fixed table, E, which may be supported upon a frame-work, F, which latter may be employed for supporting the hereinbefore-mentioned portions of the apparatus. The roller A, being rotated in the manner indicated by the arrow in Fig. 3, will rotate the belts or aprons in a direction indicated by the horizontal arrows in said figure; and inasmuch as the upper portions of said belts or aprons pass upon the upper side of this table E, it follows that the friction exerted upon the said belts or aprons causes them to resist to a certain extent the action of the roller A, thereby insuring a sufficient adhesion of the belts or aprons upon the said roller to insure their rotation by the rotation of the roller; and inasmuch as each belt is accelerated when acted upon by the adjacent shoulder or projection $a$, and inasmuch as these projections alternate, as hereinbefore explained, it follows that the increased movement during each revolution of each belt or apron will alternate with the corresponding increased movement of the belts or aprons immediately adjoining the same.

As hereinbefore explained, this peculiar alternating motion may be applied to transmitting an alternating movement to any desired mechanism. Thus, for example, it may be employed in affording a "walking" movement, as it may be termed, to the legs of toy figures, which latter are indicated by the reference-letter G in Figs. 1, 2, and 3. In this case the legs $f$ of the figures should be made of flexible material, sufficiently stiff, however, to support the bodies $g$ of said figures, the feet or lower ends of the legs $f$ being attached to two adjacent belts or aprons—that is to say, one leg to one belt and one to the other belt—and the said legs being moved forward by the alternately increased movement of the said two adjoining belts or aprons. Each figure is of course carried around with the revolution of the two belts with which it is connected, as indicated more fully in Fig. 3. It is of course to be understood that the parts may be so constructed and arranged that, instead of a slow movement of each belt alternating with the rapid movement of said belt, each belt itself may be allowed to become nearly or quite stationary during the intervals between the action of the shoulder or projection $a$ upon the belts or aprons.

In order to prevent the belts or aprons from slipping laterally out of their places, fixed guides I are provided upon the table E near the roller A, thereby preventing any sidewise movement or displacement of the said belts or aprons during their operation as aforesaid. In the modification hereinafter described in connection with Figs. 7 to 10, inclusive, these guides may, if desired, be dispensed with.

Instead of the precise construction hereinbefore explained in which the belts or aprons are actuated by the frictional contact of the circumference of the roller A upon them, the said belts may be made with openings or perforations $m$, as indicated in Figs. 7, 8, 9, and 10. In this case the shoulders or projections $a$ constitute teeth, the roller A being provided with one of these teeth or projections $a$ for each of the perforated belts or aprons, the latter being indicated by the same reference-letters as in Figs. 1 to 6, inclusive, so that at each revolution of the roller A the tooth or projection $a$ will pass into one of the openings $m$ and communicate an impetus or forward movement to the belt or apron, which continues during half of a revolution of the roller, or until the tooth or projection passes out of the opening during the continued rotation of the roller. By the time this is done the next adjacent tooth or projection $a$ in like manner passes into the adjacent opening or perforation $n$ of the next adjacent belt or apron and imparts motion thereto, while the first belt or apron, being released from the action of the adjacent tooth or projection *a*, runs loose upon the roller, so that by this means the two adjacent belts of each pair receive an alternating motion, each belt or apron being moved during one half a rotation of the roller, and being substantially stationary during the other half of the rotation.

When desired, the roller A, whether made as represented in Figs. 3, 5, and 6 or made according to the modification shown in Figs. 7 to 10, inclusive, may be constructed of varying diameter, as substantially illustrated in Figs. 7 and 8. Thus, for example, that portion of the roller designed to carry or operate any given pair of belts or aprons may be of a given diameter, while those for another pair of belts or aprons may be of a greater or less diameter, and so on for any desired number of belts or aprons. When the modification illustrated in Figs. 7 to 10, inclusive, is employed, the teeth or projections *a* serve in a great measure to retain the belts or aprons against lateral displacement; but, when desired, the guides I may be applied in connection with said belts or aprons and the roller, toothed as aforesaid, to more securely retain the belts or aprons against lateral displacement. It is of course to be understood that a rotatory motion, as indicated by the arrow in Fig. 3, is to be given to the roller A. This may be done by any suitable means—as, for example, by the use of a crank, A², as indicated in Figs. 1 and 2. For convenience, this crank may be made detachable and constructed to be applied, when required, to the shaft or gudgeons of the roller A in the same manner that detachable cranks are ordinarily applied for the temporary rotation of shafts or gearing.

I have illustrated the application of my said invention to operating mechanical toys having flexible limbs, as this is one of the uses to which my said invention may be applied. My said invention may, however, be applied to any other appropriate purpose, and is capable of useful employment in many different branches of mechanical construction. As concerns the special combination of figures having flexible legs with the various combinations included in my invention, herein set forth and claimed, I would say that said special combinations, which include as an element the flexible legs of toy figures, is claimed as a separate and distinct invention in my application for Letters Patent filed of even date with this, and indicated in the records of the Patent Office as application No. 133,628.

What I claim as my invention is—

1. In a mechanical movement, the combination of endless belts or aprons C C, roller A, constructed with gripping surfaces or devices *a* at different portions of its circumference, and a bar or support, B, all substantially as and for the purpose herein set forth.

2. In a mechanical movement, the combination of endless belts or aprons C C, roller A, constructed with gripping surfaces or devices *a* at different portions of its circumference, a bar or support, B, and an idler-bar, D, all substantially as and for the purpose herein set forth.

3. In a mechanical movement, the combination of endless belts or aprons C C, roller A, constructed with gripping surfaces or devices *a* at different portions of its circumference, a bar or support, B, and a table, E, all substantially as and for the purpose herein set forth.

4. In a mechanical movement, the combination of endless belts or aprons C C, roller A, constructed with gripping surfaces or devices *a* at different portions of its circumference, a bar or support, B, an idler-bar, D, and table E, all substantially as and for the purpose herein set forth.

5. In a mechanical movement, the combination of endless belts or aprons C C, rollers A, constructed with gripping surfaces or devices *a* at different portions of its circumference, a bar or support, B, and guides I, all substantially as and for the purpose herein set forth.

6. In a mechanical movement, the combination of endless belts or aprons C C, roller A, constructed with gripping surfaces or devices *a* at different portions of its circumference, a bar or support, B, an idler-bar, D, and guides I, all substantially as and for the purpose herein set forth.

7. In a mechanical movement, the combination of endless belts or aprons C C, roller A, constructed with gripping surfaces or devices *a* at different portions of its circumference, a bar or support, B, a table, E, and guides I, all substantially as and for the purpose herein set forth.

8. In a mechanical movement, the combination of endless belts or aprons C C, roller A, constructed with gripping surfaces or devices *a* at different portions of its circumference, a bar or support, B, an idler-bar, D, table E, and guides I, all substantially as and for the purpose herein set forth.

WM. H. ANDERSON.

Witnesses:
JOHN H. FISHER,
GURWALD AAS.